US010443362B2

(12) United States Patent
Mackay

(10) Patent No.: US 10,443,362 B2
(45) Date of Patent: Oct. 15, 2019

(54) SYSTEMS AND METHODS FOR CONTROLLING DOWNHOLE LINEAR MOTORS

(71) Applicant: Baker Hughes Incorporated, Houston, TX (US)

(72) Inventor: Evan G. Mackay, Tulsa, OK (US)

(73) Assignee: Baker Hughes Incorporated, Houston, TX (US)

( * ) Notice: Subject to any disclaimer, the term of this patent is extended or adjusted under 35 U.S.C. 154(b) by 492 days.

(21) Appl. No.: 15/145,395

(22) Filed: May 3, 2016

(65) Prior Publication Data

US 2016/0348658 A1 Dec. 1, 2016

Related U.S. Application Data

(60) Provisional application No. 62/166,268, filed on May 26, 2015.

(51) Int. Cl.

| | |
|---|---|
| ***E21B 43/12*** | (2006.01) |
| ***F04B 17/03*** | (2006.01) |
| ***F04B 49/20*** | (2006.01) |
| ***H02P 6/00*** | (2016.01) |
| ***F04B 47/02*** | (2006.01) |
| ***F04B 49/10*** | (2006.01) |
| ***F04B 47/06*** | (2006.01) |

(52) U.S. Cl.

CPC ............ *E21B 43/128* (2013.01); *F04B 17/03* (2013.01); *F04B 47/02* (2013.01); *F04B 47/06* (2013.01); *F04B 49/103* (2013.01); *F04B 49/20* (2013.01); *H02P 6/006* (2013.01); *F04B 2203/0409* (2013.01)

(58) Field of Classification Search

CPC .......... F04B 47/06; F04B 47/00; F04B 47/02; F04B 49/20; F04B 49/103; F04B 2203/0409; E21B 43/128; H02P 6/006

USPC ......................... 106/105.2; 310/12.28, 12.27

See application file for complete search history.

(56) References Cited

U.S. PATENT DOCUMENTS

| | | | | |
|---|---|---|---|---|
| 1,902,371 A * | 3/1933 | Greene | .................. | F04B 49/06 192/116.5 |
| 2,222,823 A | 11/1940 | Parenti | | |
| 2,839,237 A | 6/1958 | Dolz | | |
| 2,929,455 A | 3/1960 | Godbey | | |

(Continued)

FOREIGN PATENT DOCUMENTS

| | | |
|---|---|---|
| JP | 2011117336 A | 6/2011 |

*Primary Examiner* — Christopher S Bobish

(74) *Attorney, Agent, or Firm* — Sprinkle IP Law Group

(57) ABSTRACT

Systems and methods for detecting and arresting free fall of a mover in a linear motor for an ESP. In one embodiment, the motor of the ESP is initially automatically commutated, but is limited by the back pressure of the fluid being pumped. The drive system of the ESP monitors the speed of the mover in the linear motor and determines whether the speed of the mover exceeds a threshold speed (e.g., by determining whether time differentials between transitions in position sensor signals fall below a threshold value). If the speed of the mover does not exceed the threshold speed, the motor is deemed not to be in free fall. If the speed of the mover exceeds the threshold speed, the motor is considered to be in free fall, so automatic commutation of the motor is disabled and the mover is advanced through its stroke at a predetermined speed.

20 Claims, 4 Drawing Sheets

110
112
113
150
122
130
120
121
123
124

(56) References Cited

U.S. PATENT DOCUMENTS 2,961,149 A 11/1960 Hull
2,988,264 A 6/1961 Reutter
3,075,466 A 1/1963 Agnew
3,390,580 A 7/1968 Taylor
4,583,916 A 4/1986 Senghaas
4,687,054 A * 8/1987 Russell .................. E21B 43/00 166/105
5,734,209 A * 3/1998 Hallidy ................ E21B 43/128 310/12.04
6,213,722 B1 * 4/2001 Raos .................... F04B 17/042 417/417
6,315,523 B1 * 11/2001 Mills ...................... F04B 47/02 307/150
6,749,017 B1 * 6/2004 Lu ........................ E21B 43/126 166/105
6,890,156 B2 * 5/2005 Watson ................ F04B 47/022 417/42
7,795,824 B2 * 9/2010 Shen ...................... F04B 47/00 318/135
8,106,615 B2 * 1/2012 Tsuruta .................. F04B 47/02 318/471
8,167,593 B2 5/2012 Gohean
8,282,366 B2 10/2012 Hilber
8,417,483 B2 * 4/2013 Anderson ............ E21B 47/042 700/281
9,140,253 B2 * 9/2015 Wentworth ............ F04B 47/02
2006/0043921 A1 * 3/2006 Nagura .................... H02P 3/26 318/700
2008/0036305 A1 * 2/2008 Raos ..................... H02K 41/03 310/14
2010/0116508 A1 * 5/2010 Oglesby ............... E21B 43/128 166/369
2011/0097214 A1 * 4/2011 Wentworth ............ F04B 49/06 417/44.1
2012/0205119 A1 * 8/2012 Wentworth ............ F04B 49/06 166/369
2016/0131128 A1 * 5/2016 Doyle .................. E21B 43/127 74/36

* cited by examiner

SYSTEMS AND METHODS FOR CONTROLLING DOWNHOLE LINEAR MOTORS

CROSS-REFERENCE TO RELATED APPLICATIONS

This application claims the benefit of U.S. Provisional Patent Application 62/166,268, filed May 26, 2016 by Evan G. Mackay, which is incorporated by reference as if set forth herein in its entirety.

BACKGROUND

Field of the Invention.

The invention relates generally to downhole tools for use in wells, and more particularly to means for controlling a downhole linear motor to stop free fall of the motor's mover, which might otherwise damage the motor.

Related Art.

In the production of oil from wells, it is often necessary to use an artificial lift system to maintain the flow of oil. The artificial lift system commonly includes an electric submersible pump (ESP) that is positioned downhole in a producing region of the well. The ESP has a motor that receives electrical signals from equipment at the surface of the well. The received signals run the motor, which in turn drives a pump to lift the oil out of the well.

ESP motors commonly use rotary designs in which a rotor is coaxially positioned within a stator and rotates within the stator. The shaft of the rotor is coupled to a pump, and drives a shaft of the pump to turn impellers within the body of the pump. The impellers force the oil through the pump and out of the well. While rotary motors are typically used, it is also possible to use a linear motor. Instead of a rotor, the linear motor has a mover that moves in a linear, reciprocating motion. The mover drives a plunger-type pump to force oil out of the well.

In order to properly control a linear motor, it is desirable to know the position of the mover within the stator. Linear motors may use several sensors (e.g., Hall-effect sensors) to determine the position of the mover. The signals from these sensors (which may be referred to herein as the Hall signals) are provided to a control system, which then produces a drive signal based upon the position of the mover and provides this drive signal to the motor to run the motor. In one system, the state of the drive signal is automatically commutated based on the Hall signals. The speed of the motor is controlled by increasing or decreasing the voltage of the drive signal.

In one particular system, the power stroke of the linear motor (the stroke that drives the pump to pump fluid) is downward. There is normally a certain amount of back pressure during the power stroke which prevents the mover of the linear motor from free-falling due to gravity. This back pressure is caused by the fluid that is present in the barrel of the pump and/or the production tubing above the pump. (The fluid is drawn into the pump on the return stroke and forced from the pump to the production tubing on the power stroke.) In some situations, this fluid may not be present in the pump, such as when the pump is started, or if gas in the fluid causes the pump to lose its prime. The absence of back pressure from the fluid may allow the motor's mover to free fall under the force of gravity. Because the mover may be quite heavy, the free fall of the mover into a hard stop at the bottom of the motor may damage the motor. It should be noted that this may be a problem when the downward stroke of the motor is the return stroke, as well as the power stroke.

It would therefore be desirable to provide means to prevent the free fall of the mover, and thereby prevent damage that might result from this situation.

SUMMARY OF THE INVENTION

This disclosure is directed to systems and methods for arresting free fall of a mover in a linear motor that may be used, for example, in an ESP. One particular embodiment is a method for detecting and arresting free fall of a mover in a linear motor for an ESP. In this method, the motor of the ESP is initially automatically commutated, so the speed is not controlled, but is instead limited by the back pressure of the fluid being pumped. The drive system of the ESP monitors the speed of the mover in the linear motor and determines whether the speed of the mover exceeds a threshold speed. If the speed of the mover does not exceed the threshold speed, the motor is deemed not to be in free fall. If the speed of the mover exceeds the threshold speed, the motor is considered to be in free fall, so automatic commutation of the motor is disabled and the mover is advanced through its stroke at a predetermined speed.

Because the mover can only be in free fall on the downstroke, one embodiment only determines whether the speed of the mover exceeds the threshold speed on the downstroke of the linear motor. If the speed of the mover exceeds the threshold speed and automatic commutation of the linear motor is disabled, the mover may be advanced at the predetermined speed for a single stroke, or for multiple cycles of the motor. The number of cycles may be predetermined. After the mover is advanced at the predetermined speed for the predetermined number of cycles, the system may resume automatic commutation of the motor. The monitoring the mover's speed may be achieved by monitoring signals received from position in the motor and determining the speed of the mover based on the signals received from position sensors. For example, the signals may comprise a composite signal that combines signals from multiple Hall-effect sensors, and the speed of the mover may be determined from time differentials between transitions in the composite signal, where differentials that fall below a threshold value indicate that the speed of the mover has exceeded a threshold speed.

An alternative embodiment comprises an apparatus for detecting and arresting free fall of a mover in a linear motor for an ESP. The apparatus includes an ESP having a linear motor and an electric drive system that is coupled to the ESP. The electric drive system includes a controller that is configured to automatically commutate the motor, monitor the speed of the mover in the motor, determine whether the speed of the mover exceeds a threshold speed. If the speed of the mover exceeds the threshold speed, controller is configured to disable automatic commutation of the linear motor and advance the mover at a predetermined speed to prevent the mover from free falling and damaging the motor. The controller may be configured to determine the speed of the mover and compare it to the threshold speed only on a downstroke of the motor. The controller may be configured to receive signals from position sensors (e.g., Hall-effect sensors) that are installed in the linear motor and are responsive to the position of the mover in the linear motor. The controller may receive the signals in the form of a composite signal that combines signals output by the position sensors. The controller may be configured to monitor the speed of the mover in the linear motor by monitoring time differentials between transitions in the composite signal. If one of these time differentials is less than a threshold time value, the mover is determined to have exceeded the threshold speed. In this case, the controller advances the mover at the predetermined speed for at least one stroke (e.g., for a predetermined number of cycles). Afterward, the controller may resume automatic commutation of the motor.

Numerous other embodiments are also possible.

BRIEF DESCRIPTION OF THE DRAWINGS

Other objects and advantages of the invention may become apparent upon reading the following detailed description and upon reference to the accompanying drawings.

Figure 1:
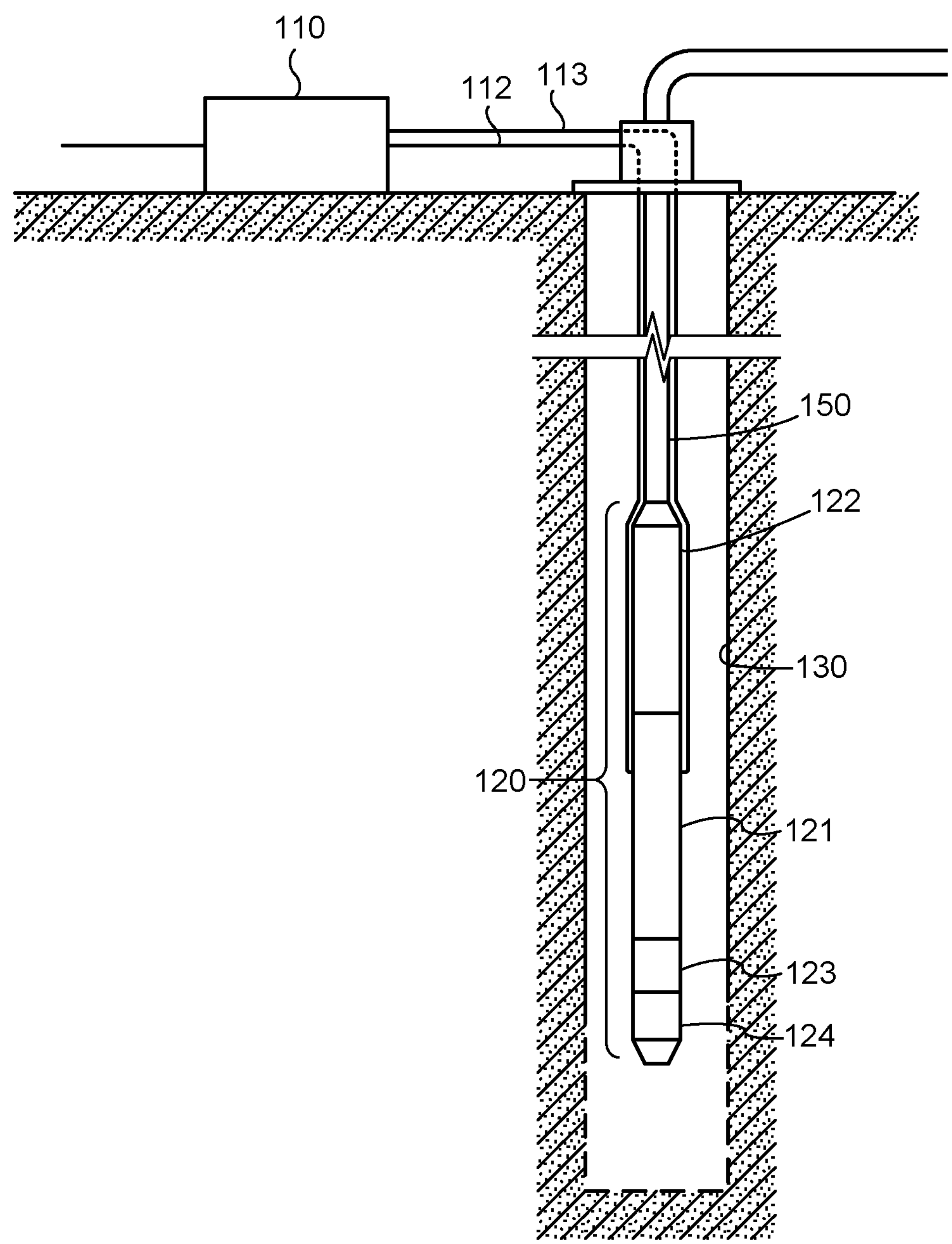
FIG. 1 is a diagram illustrating an exemplary pump system in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims. Further, the drawings may not be to scale, and may exaggerate one or more components in order to facilitate an understanding of the various features described herein.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for arresting (stopping) the free fall of a mover in a downhole linear motor if the motor does not have the back pressure that normally prevents the free fall of the mover during normal operation of the motor. This back pressure is normally provided by the presence of fluid in the barrel of a pump that is driven by the motor.

In one embodiment, a controller at the surface of a well monitors signals received from position sensors (e.g., Hall-effect sensors) in the linear motor. The controller determines the time differentials between successive signal transitions and uses the time differentials to determine whether the mover is moving too quickly (i.e., faster than a threshold speed) on a downward stroke. The controller may, for instance, determine whether the time differentials are less than a threshold value. If the time differentials are greater than the threshold value, the mover is determined not to be free-falling. If the time differentials are less than the threshold value, the mover is determined to be falling faster than a threshold speed which corresponds to the threshold time differential and is considered to be free-falling, so automatic commutation of the motor is disabled and the motor is walked through the downward stroke at a predetermined speed. This prevents the mover from hitting a hard stop at the bottom of the motor's stator. The mover is walked through a predetermined number of cycles (downstroke and upstroke) to prime the pump. After these cycles have been completed and the pump is primed, the motor begins (or resumes) operating in an automatic commutation mode.

Referring to FIG. 1, a diagram illustrating an exemplary pump system in accordance with one embodiment of the present invention is shown. A wellbore 130 is drilled into an oil-bearing geological structure and is cased. The casing within wellbore 130 is perforated in a producing region of the well to allow oil to flow from the formation into the well. Pump system 120 is positioned in the producing region of the well. Pump system 120 is coupled to production tubing 150, through which the system pumps oil out of the well. A control system 110 is positioned at the surface of the well. Control system 110 is coupled to pump 120 by power cable 112 and a set of electrical data lines 113 that may carry various types of sensed data and control information between the downhole pump system and the surface control equipment. Power cable 112 and electrical lines 113 run down the wellbore along tubing string 150.

Pump 120 includes an electric motor section 121 and a pump section 122. In this embodiment, an expansion chamber 123 and a gauge package 124 are included in the system. (Pump system 120 may include various other components which will not be described in detail here because they are well known in the art and are not important to a discussion of the invention.) Motor section 121 receives power from control system 110 and drives pump section 122, which pumps the oil through the production tubing and out of the well.

In this embodiment, motor section 121 is a linear electric motor. Control system 110 receives AC (alternating current) input power from an external source such as a generator (not shown in the figure), rectifies the AC input power and then converts the DC (direct current) power to produce three-phase AC output power which is suitable to drive the linear motor. The output power generated by control system 110 is dependent in part upon the position of the mover within the stator of the linear motor. Position sensors in the motor sense the position of the mover and communicate this information via electrical lines 113 to control system 110 so that the mover will be driven in the proper direction (as will be discussed in more detail below). The output power generated by control system 110 is provided to pump system 120 via power cable 112.

Figure 2:
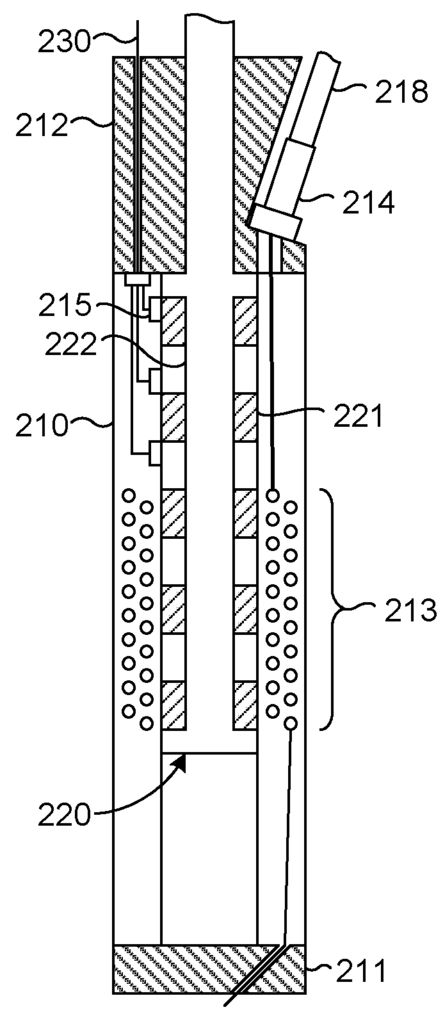
FIG. 2 is a diagram illustrating an exemplary linear motor in accordance with one embodiment which would be suitable for use in the pump system of FIG. 1.

Referring to FIG. 2, a diagram illustrating an exemplary linear motor which would be suitable for use in the pump system of FIG. 1 is shown. The linear motor has a cylindrical stator 210 which has a bore in its center. A base 211 is connected to the lower end of stator 210 to enclose the lower end of the bore, and a head 212 is connected to the upper end of the stator. Motor head 212 has an aperture therethrough to allow the shaft 222 of the mover 220 to extend to the pump. In this embodiment, the pump is configured to draw fluid into the pump on the upstroke and expel the fluid on the downstroke. In other words, the downstroke is the power stroke and the upstroke is the return stroke.

Stator 210 has a set of windings 213 of magnet wire. Windings 213 include multiple separate coils of wire, forming multiple poles within the stator. The ends of the windings are coupled (e.g., via a pothead connector 214) to the conductors of the power cable 218. Although the power cable has separate conductors that carry the three phase power to the motor, the conductors are not depicted separately in the figure for purposes of simplicity and clarity. Similarly, the coils of magnet wire are not separately depicted. The coils may have various different configurations, but are collectively represented as component 213 in the figure.

The windings are alternately energized by the signals received through the power cable to generate magnetic fields within the stator. These magnetic fields interact with permanent magnets 221 on the shaft 222 of mover 220, causing mover 220 to move up and down within the motor. The waveform of the signal provided by the drive via the power cable (in this case a three-phase signal) is controlled to drive mover 220 in a reciprocating motion within the bore of stator 210. Stator 210 incorporates a set of Hall-effect sensors 215 to monitor the position of mover 220 within stator 210. The outputs of Hall-effect sensors 215 are transmitted to the controller. They may be transmitted as distinct signals, or they may be combined (e.g., XOR'd) to form one or more composite signals. The mover may also be coupled to an absolute encoder of some type, and data from this encoder may be transmitted to the controller. The controller then tracks the motor position based on the received signals.

Figure 3:
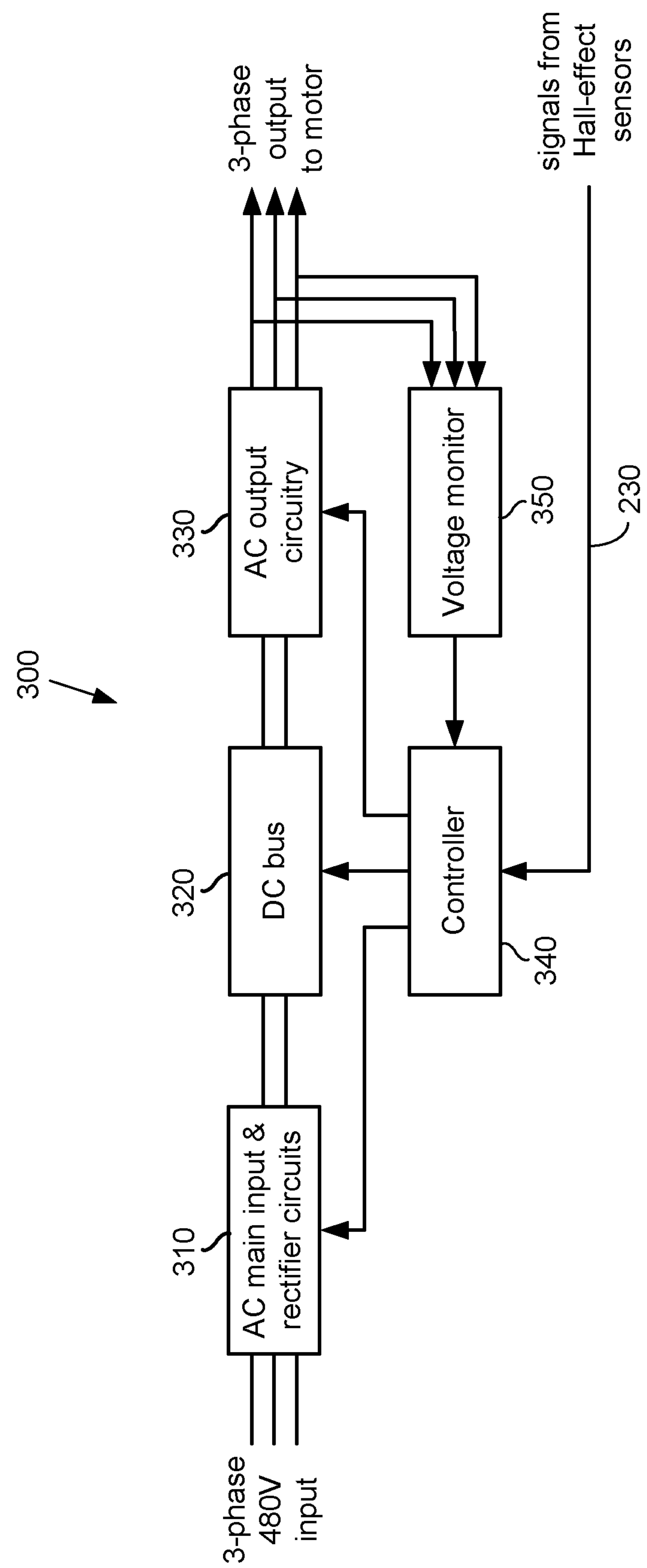
FIG. 3 is a functional block diagram illustrating the structure of a control system for a linear motor in accordance with one embodiment.

Referring to FIG. 3, a functional block diagram illustrating the structure of an exemplary control system for a linear motor in one embodiment is shown. The control system is incorporated into a drive system (e.g., 110) for the linear motor. The drive system receives AC input power from an external source and generates three-phase output power that is provided to the linear motor to run the motor. The drive system also receives position information from the linear motor and uses this information when generating the three-phase power for the motor. It should be noted that the system of FIG. 3 is exemplary, and alternative embodiments may employ other components or technologies to produce an output signal to drive the linear motor.

As depicted in FIG. 3, drive system 300 has input and rectifier circuitry 310 that receives AC input power from the external power source. Circuitry 310 converts the received AC power to DC power at a predetermined voltage and provides this power to a DC bus 320. The DC power on the DC bus is provided in this embodiment to output circuitry 330 that includes a set of IGBT (insulated gate bipolar transistor) switches. The switches of output circuitry 330 are controlled by motor controller 340 to produce an AC signal, such as a six-step or PWM waveform. Output circuitry 330 may include filters to modify the generated waveform before it is output to the motor. For instance, it may be necessary to perform PWM filtering on a PWM waveform in order to prevent damage to the power cable or motor. The signal produced by output circuitry 330 is transmitted to the downhole linear motor via a power cable. As noted above, this system is exemplary, and alternative embodiments may use other technologies (e.g., a matrix converter) to generate the desired output signal from the AC input power.

The power produced by output circuitry 330 is monitored by voltage monitor 350. Voltage monitor 350 provides a signal indicating the voltage output by output circuitry 330 as an input to motor controller 340. Motor controller 340 also receives position information from the downhole linear motor. In one embodiment, this position information consists of the signals generated by the Hall-effect sensors as described above in connection with FIG. 2. Motor controller 340 uses the received position information to determine the position and speed of the mover within the linear motor. Based upon this position and speed information, as well as the information received from voltage monitor 350, controller 340 controls output circuitry 330 to generate the appropriate output signal.

The downhole linear motor is an electrically commutated motor. In other words, the commutation or changing of the voltage of the power provided to the motor is accomplished electrically via the surface drive unit. In normal operation (while the system is operating to pump fluid from the well), the motor is automatically commutated based on the position of the mover. More specifically, in this embodiment, the motor is automatically commutated based on the Hall signals. The output signals produced by the drive system are therefore generated to stay slightly ahead of the mover, regardless of the mover's speed, rather than being generated at a specific frequency. The speed of the motor is controlled by varying the voltage of the drive signal provided to the motor, and not by directly controlling the frequency of the drive signal. Because of the back pressure of the fluid in the pump, this scheme does not normally result in the unchecked increase of the motor's speed.

If, for some reason, the pump does not have fluid in its barrel/chamber, there will be insufficient back pressure to resist the downward movement of the mover on the power stroke (the downstroke). The mover may therefore fall, unchecked, until it hits a hard stop. This may damage the motor and/or the pump. The present systems are therefore configured to monitor the speed of the motor, detect a free fall condition, and disable automatic commutation of the motor. The motor is then operated at a predetermined frequency until the pump is primed (i.e., there is fluid in the barrel) and can safely be automatically commutated.

Figure 4:
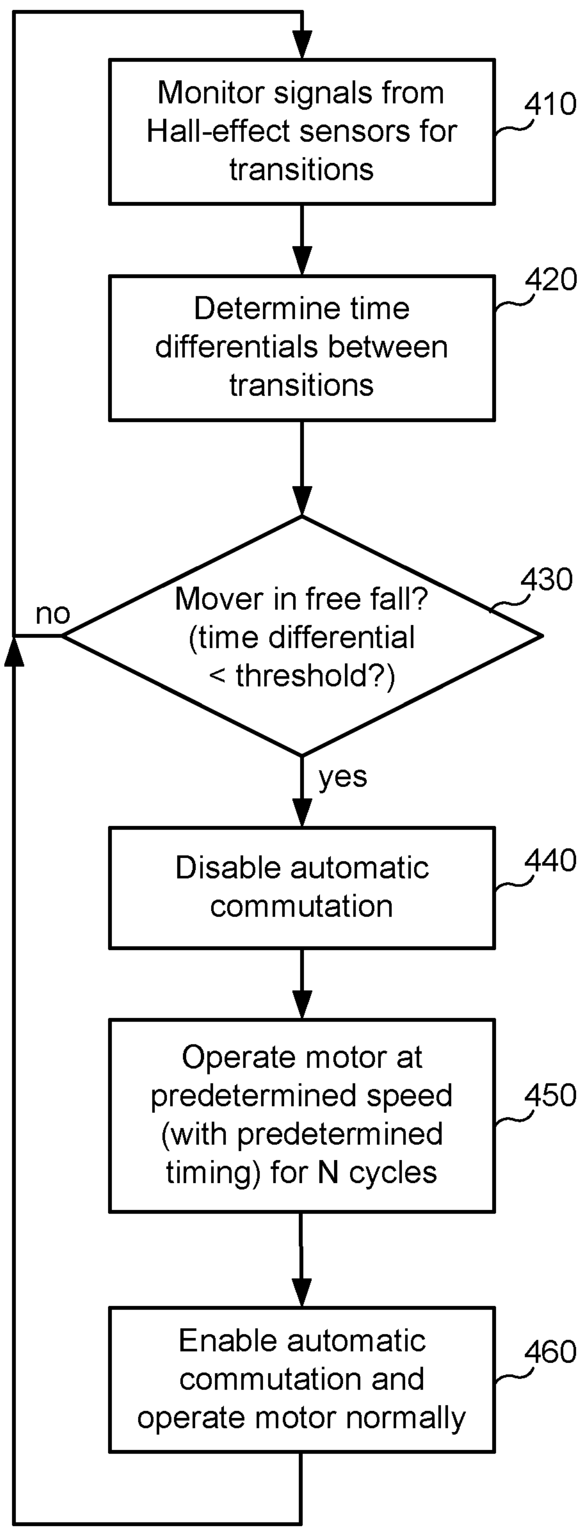
FIG. 4 is a flow diagram illustrating a method for arresting free-fall of a mover in a linear motor in accordance with one embodiment.

Referring to FIG. 4, a flow diagram illustrating the operation of a downhole linear motor in accordance with one embodiment is shown. In this embodiment, the motor is initially running and driving a pump. Automatic commutation based on the Hall signals is enabled. In one embodiment, this method is implemented in a controller of the electric drive system (e.g., the motor controller 340 of FIG. 3), in communication with the downhole linear motor.

As the motor is running, the Hall signals are monitored and the transitions of the Hall signals are identified (410). Each of the transitions indicates that the motor's mover has moved to a corresponding position within the motor. In some embodiments, each transition is associated with a particular Hall-effect sensor and indicates a specific position of the mover within the motor. In other embodiments the Hall signals are not individually identifiable as being associated with a particular sensor, but the position of the mover can be derived from other information, such as a known initial position of the mover and a sequence of Hall signal transitions following this known position.

It should be noted that, although this embodiment uses Hall-effect sensors to detect movement of the mover, alternative embodiments may use other means. For instance, one alternative embodiment may monitor the conductors of the power cable to identify a back-emf (electromotive force) that is generated by movement of the mover. In this embodiment, the motor effectively acts as a generator and, as the mover falls, the motor generates a voltage at its input terminals.

The system determines the time differentials between the Hall signal transitions (420). The time differentials between the Hall signals are then compared to expected minimum values (430). The expected values may be determined based on a number of factors, such as the voltage of the power being supplied to the motor, the volume of fluid in the column above the pump/motor, previously determined time differentials, etc. The comparison may involve time differentials between each successive Hall signal, or it may include only a subset of the time differentials. For instance, it is possible to compare only those time differentials associated with the end of the stroke, while disregarding time differentials associated with the middle of the stroke. Further, in the exemplary motor described above, it is only necessary to determine the time differentials on the downward (power) stroke. In one embodiment, the time differentials may be compared to a single expected value, while in other embodiments, time differentials associated with different parts of the stroke may be compared with different expected values (i.e., a profile of values corresponding to the different portions of the stroke).

If the comparison shows that the actual time differentials between the Hall signals is greater than the expected minimum value(s), there is sufficient back pressure from the pump that the mover is being prevented from free-falling. Consequently, the motor continues to operate in the automatic commutation mode, and continues to monitor the Hall signals (410) and compare the time differentials to expected values (420). If, on the other hand, the comparison shows that an actual time differential between Hall signals is less than the expected minimum value, this indicates that there is insufficient back pressure from the pump. The mover is therefore in free fall. In this case, the automatic commutation of the motor is disabled (440) and the motor begins operating in a controlled commutation mode.

Rather than commutating the motor based on the signals from the Hall-effect sensors, the motor is "walked through" the power stroke (450). In other words, the motor is commutated with a predetermined frequency at which the speed of the mover is slow enough that it will not hit a hard stop at the bottom of the power stroke so hard that it might damage the motor. In this "walk-through" mode, the commutation of the motor is not affected by the signals from the Hall-effect sensors. In one embodiment, when free fall of the mover is detected, the motor is walked through several cycles (power stroke and return stroke) in this manner. Operating the linear motor in the walk-through mode for several cycles should allow the pump barrel to fill with fluid (i.e., the pump should be primed). The number of cycles may be predetermined, or it may be dynamically determined. After the walk-though cycles have been completed, the motor may be returned to the automatic commutation mode (460).

While the method depicted in FIG. 4 assumes that the motor is initially running with automatic commutation enabled, this is not necessarily the case in alternative embodiments. In one alternative embodiment, for example, a similar method may be used to start up an ESP. In this embodiment, the pump may not have any fluid in its barrel because it has not yet been operated. The motor may therefore operate in the walk-through mode for several cycles to prime the pump, and then the motor may be switched to an automatic commutation mode. In either the startup case, or the case in which the motor is initially running, the walk-through phase may include steps to gradually return the motor to the automatically commutated mode. For instance, the motor could be operated at at several different frequencies/speeds (e.g., at a first frequency for several cycles, then a higher speed for several more cycles), and then it may begin automatically commutating.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the described embodiments. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the described embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within this disclosure.

What is claimed is:

1. A method for detecting and arresting free fall of a mover in a linear motor for an electric submersible pump (ESP), the method comprising:
automatically commutating a linear motor of an ESP;
monitoring a speed of a mover in the linear motor wherein during automatic commutation of the linear motor, the speed of the linear motor is not electronically limited;
determining whether the speed of the mover exceeds a threshold speed; and
if the speed of the mover exceeds the threshold speed, disabling automatic commutation of the linear motor and advancing the mover in the linear motor at a predetermined speed.

2. The method of claim 1, wherein determining whether the speed of the mover exceeds the threshold speed is performed only on a downstroke of the linear motor.

3. The method of claim 1, wherein if the speed of the mover exceeds the threshold speed, automatic commutation of the linear motor is disabled and the mover is advanced at the predetermined speed for at least one stroke.

4. The method of claim 3, wherein if the speed of the mover exceeds the threshold speed, automatic commutation of the linear motor is disabled and the mover is advanced at the predetermined speed for a predetermined number of cycles.

5. The method of claim 4, further comprising, after advancing the mover at the predetermined speed for the predetermined number of cycles, resuming automatic commutation of the motor.

6. The method of claim 1, wherein monitoring the speed of the mover in the linear motor comprises monitoring signals received from one or more position sensors located in the linear motor and determining the speed of the mover based on the signals received from one or more position sensors.

7. The method of claim 6, wherein the signals received from one or more position sensors comprise a composite signal that combines signals output by a plurality of Hall-effect sensors located in the linear motor, and wherein monitoring the speed of the mover in the linear motor comprises monitoring time differentials between transitions in the composite signal.

8. The method of claim 7, wherein if one or more time differentials between transitions in the composite signal are less than a threshold time value, the mover is determined to have exceeded the threshold speed.

9. An apparatus for detecting and arresting free fall of a mover in a linear motor for an electric submersible pump (ESP), the apparatus comprising:

an ESP having a linear motor; and an electric drive system coupled to the ESP, wherein the electric drive system includes a controller that is configured to automatically commutate the linear motor, monitor a speed of a mover in the linear motor, determine whether the speed of the mover exceeds a threshold speed, and if the speed of the mover exceeds the threshold speed, disable automatic commutation of the linear motor and advance the mover in the linear motor at a predetermined speed;

wherein during automatic commutation of the linear motor, the speed of the linear motor is not electronically limited.

10. The apparatus of claim 9, wherein the controller determines whether the speed of the mover exceeds the threshold speed only on a downstroke of the linear motor.

11. The apparatus of claim 9, wherein the controller is configured to receive signals from one or more position sensors that are installed in the linear motor, wherein the signals are responsive to positions of a mover in the linear motor.

12. The apparatus of claim 11, wherein the one or more position sensors comprise Hall-effect sensors.

13. The apparatus of claim 12, wherein the signals from the Hall-effect sensors comprise signal transitions that corresponding to different positions of the mover within the linear motor.

14. The apparatus of claim 13, wherein the signals received from the Hall-effect sensors comprise a composite signal that combines signals output by the Hall-effect sensors, wherein the controller is configured to monitor the speed of the mover in the linear motor by monitoring time differentials between transitions in the composite signal.

15. The apparatus of claim 14, wherein if one or more time differentials between transitions in the composite signal are less than a threshold time value, the mover is determined to have exceeded the threshold speed.

16. The apparatus of claim 9, wherein if the controller determines that the speed of the mover exceeds the threshold speed and disables automatic commutation of the linear motor, the controller generates output power that advances the mover of the linear motor at the predetermined speed for at least one stroke.

17. The apparatus of claim 16, wherein if the controller determines that the speed of the mover exceeds the threshold speed and disables automatic commutation of the linear motor, the controller generates output power that advances the mover of the linear motor at the predetermined speed for a predetermined number of cycles.

18. The apparatus of claim 17, wherein the controller, after advancing the mover at the predetermined speed for the predetermined number of cycles, resumes automatic commutation of the motor.

19. The apparatus of claim 16, wherein the controller advancing the mover at the predetermined speed comprises providing output power to the linear motor that steps the mover through the at least one stroke.

20. The apparatus of claim 9, wherein the controller is configured to monitor the speed of the mover in the linear motor by monitoring signals received from one or more position sensors located in the linear motor and determining the speed of the mover based on the signals received from one or more position sensors.

* * * * *